Feb. 3, 1970  F. J. SANTANGELO  3,493,458
REINFORCED SHRINK RESISTANT PANEL
Filed May 5, 1966  3 Sheets-Sheet 2
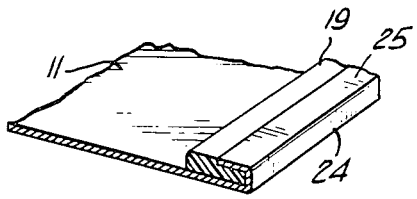
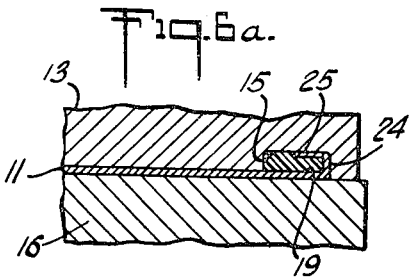
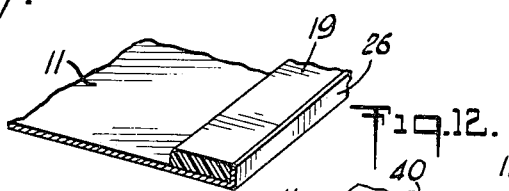
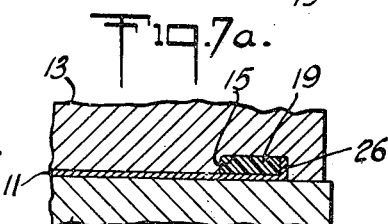
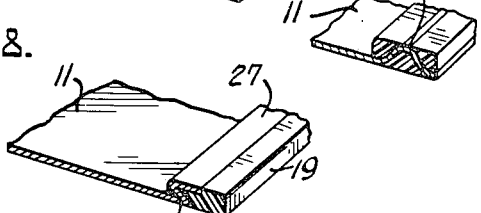
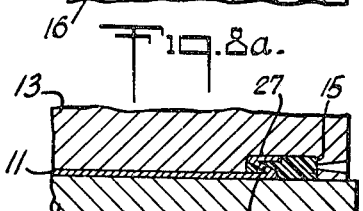
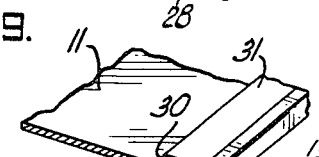
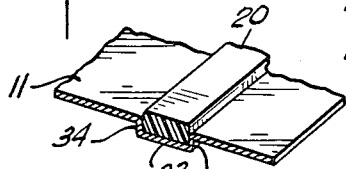
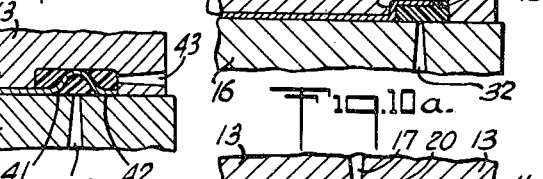
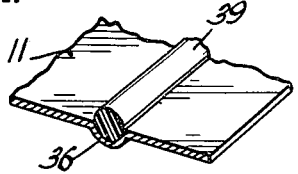
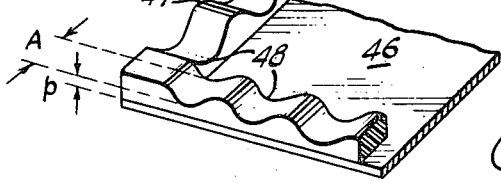
INVENTOR.
FRANCIS J. SANTANGELO
BY
ATTORNEY Feb. 3, 1970   F. J. SANTANGELO   3,493,458
REINFORCED SHRINK RESISTANT PANEL
Filed May 5, 1966   3 Sheets-Sheet 3
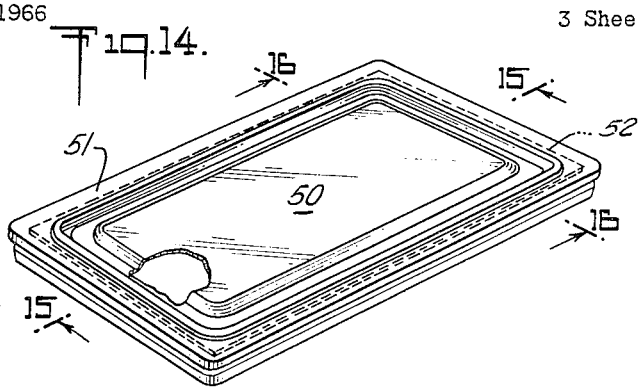
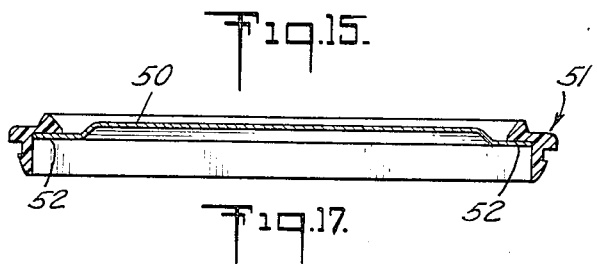
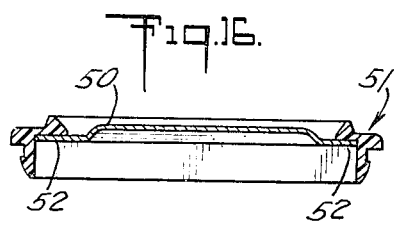
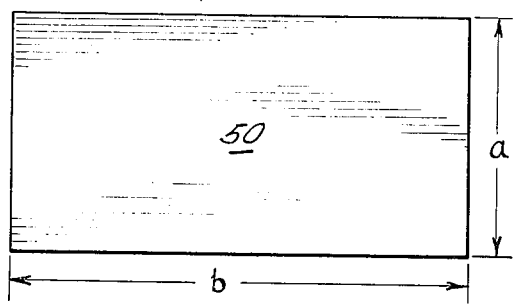
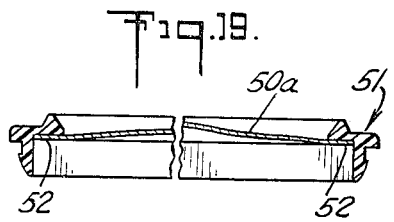
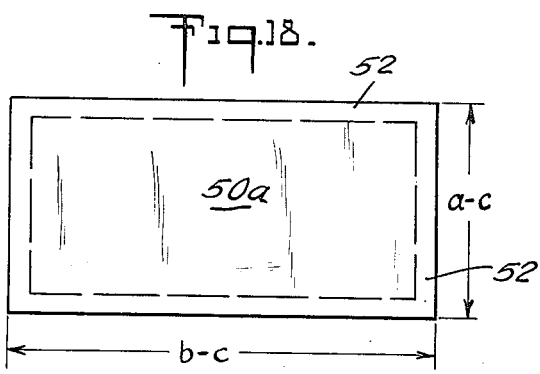
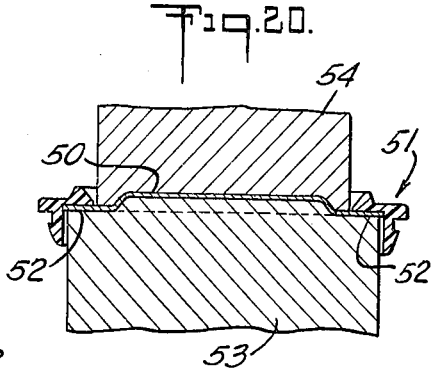
INVENTOR
FRANCIS J. SANTANGELO
BY
Arnold J. Worfolk
ATTORNEY United States Patent Office 3,493,458
Patented Feb. 3, 1970

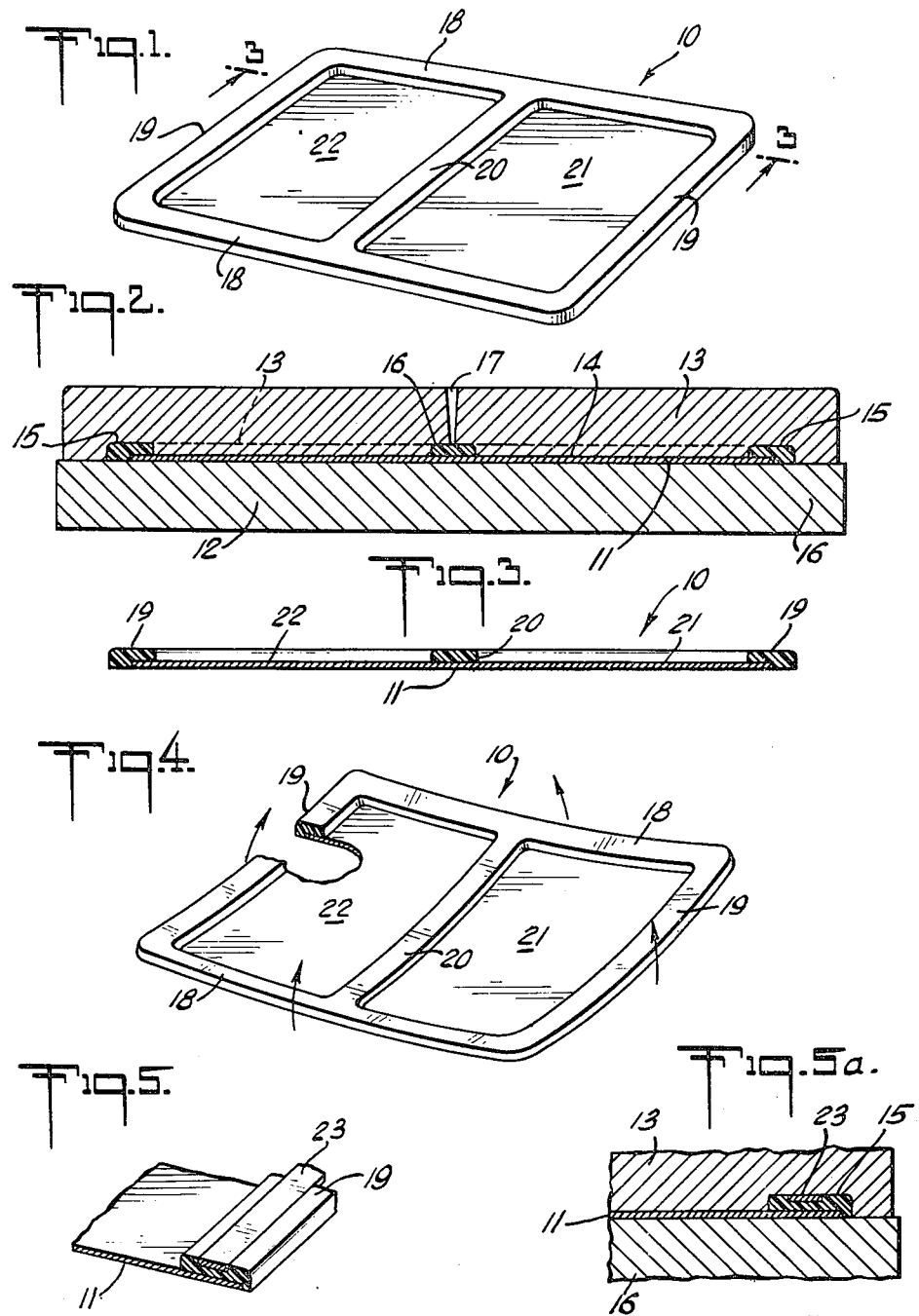

3,493,458
REINFORCED SHRINK RESISTANT PANEL
Francis J. Santangelo, Middlesex, N.J., assignor to Johnson & Johnson, a corporation of New Jersey
Continuation-in-part of application Ser. No. 476,520, Aug. 2, 1965. This application May 5, 1966, Ser. No. 547,981
Int. Cl. B32b 29/00; B29f 1/10
U.S. Cl. 161—44                                    12 Claims

ABSTRACT OF THE DISCLOSURE

A composite paneling structure comprised of a blank of flexible sheet material such as paper, paperboard or cardboard and rigid structural reinforcing units of thermoplastic material secured to the flexible sheet material for imparting structural stability thereto. The rigid structural units of thermoplastic material include means remote from the bonded interface between the rigid structural units and the flexible sheet material for counteracting differential shrinkage characteristics existent in the thermoplastic structural units thereby preventing warpage or distortion of the flexible sheet material out of its desired configuration.

RELATED APPLICATIONS FOR PATENT

This application is a continuation-in-part of application Ser. No. 476,520 filed Aug. 2, 1965, now abandoned in the name of Francis J. Santangelo for Composite Panel.

BACKGROUND OF THE INVENTION

This invention relates to composite paneling of the general type characteristic of Schenk et al., 3,119,540 wherein a blank of flexible sheet material is located in a mold with given contour and wherein thermoplastic material is injected into the mold into bonding engagement with a face portion of the flexible sheet material to produce a rigid structural reinforcing unit for maintaining the contour of the paneling when removed from the mold. More particularly the invention relates to composite paneling of such type wherein provision is made for counteracting the effects of shrinkage in the plastic material that result in warpage or distortion of the paneling.

An injection molded plastic structural member, associated with composite paneling may tend to shrink after the paneling is removed from the mold. If the plastic structural member has an unbalanced disposition with respect to an adjacent panel section, i.e., if it is adhesively bonded to the paneling section on one face only of the plastic structural member, shrinkage can occur unevenly from a minimum in the region adjacent the bonded interface between the plastic and the panel material to a maximum in the region of the plastic member most remote from such bonded interface.

It is believed that if the paneling material participates in little or no shrinkage and that if this ability to resist shrinkage is transmitted through the bonded interface to adjacent plastic structural material, and uncontrolled shrinkage permitted in the plastic material at points remote from the interface, uneven shrinkage in the plastic structural member results causing panel warpage unless steps are taken to resist this phenomenon.

SUMMARY OF THE INVENTION

In accordance with the present invention, the effects of shrinkage in a plastic structural member section are reduced or substantially eliminated, by injection molding the structural member section into bonded engagement with a surface section of a shrinkage resisting insert disposed out of the plane of the surface of the paneling to which the structural member is adhered. The shrinkage resisting inserts in the plastic structural member sections are disposed in strategically located positions so as to balance the distribution of the shrinkage forces.

Also in accordance with the present invention, the effects of shrinkage in a plastic structural member section are reduced or eliminated by interrupting the area over which the shrinkage forces act to destroy their unity of action.

Also in accordance with the present invention, the effects of shrinkage in a plastic structural member bonded to paneling material of substantially lesser shrinkage characteristics can be substantially reduced by using a marginal area of the paneling material as the shrinkage resisting insert and disposing the insert codirectional with the plastic structural member and with respect to its cross-section such that the shrinkage forces in the plastic material acting in the direction of the structural member and on one side of the insert, tending to warp or bend the member in one direction, is counter-balanced by the shrinkage forces in the plastic material acting likewise in the direction of the structural member but on the other side of the insert thereby tending to warp or bend the member in the opposite direction. Thus, when the shrinkage forces acting in the direction of a plastic structural member but on opposite sides of the insert are in balance, warpage in such a plastic structural member is eliminated. If the shrinkage resisting insert is capable of resisting all shrinkage forces exerted upon it by the plastic material without linear compaction in the insert, warpage in the panel is avoided, too. However, where the marginal areas are the shrinkage resisting elements and their strength is not sufficient to resist all linear compaction in such areas, undesirable warpage in the paneling material as distinguished from warpage in the plastic structural member may result. In accordance with the invention such undesirable warpage is compensated for by embossing a pattern in the panel.

A better understanding of the invention may be had from the following description read with the accompanying drawings wherein:

FIG. 1 is a perspective view of composite paneling comprising flexible sheet material and injection molded plastic structural member sections, the paneling shown having utility in demonstrating the invention;

FIG. 2 is a vertical cross sectional view through a mold suitable for injection molding paneling of the type illustrated in FIG. 1;

FIG. 3 is a transverse cross sectional view on line 3—3 of FIG. 1;

FIG. 4 is a perspective view of paneling of the type shown in FIG. 1 illustrating warpage which occurs in the paneling absent steps for counterbalancing it;

FIGS. 5 to 12 inclusive are fragmental perspective views of composite paneling of flexible sheet material and plastic structural members incorporating different embodiments of the present improvements;

FIGS. 5a to 12a inclusive are fragmental transverse sectional views through injection molds for producing the different embodiments of the composite panels illustrated in FIGS. 5 to 12 respectively;

FIG. 13 is a fragmental perspective view of composite paneling of flexible sheet material and plastic structural members illustrating still a different embodiment of the invention.

FIG. 14 is a perspective view of a composite panel in which the marginal areas of the paneling material con- an embossment is used to compensate for warpage in the panel material;

FIG. 15 is a longitudinal sectional view on line 15—15 of FIG. 14;

FIG. 16 is a transverse sectional view on line 16—16 of FIG. 14;

FIG. 17 is a plan view of a blank of paneling material prior to its insertion in the mold;

FIG. 18 is a diagrammatic plan view illustrating the effect on paneling material of compaction along its marginal edges.

FIG. 19 is a sectional view through a panel before embossment to compensate for marginal edge compaction; and FIG. 20 is a transverse sectional view through a pair of embossing dies with a composite panel shown in position therebetween.

A composite test panel 10 suitable for demonstrating the present improvements is illustrated in FIGS. 1 and 3. It comprises a sheet 11 of flexible material which may be placed flat on the bed 12 of a mold whose cap 13 closes on the sheet to hold it in place. The mold cap in its bottom face has a recess 14 to accommodate the thickness of the sheet and a cavity 15 extending around the peripheral edges of the sheet and into which such peripheral edges extend for a substantial distance. A median cavity 16 interconnects the cavity sections 15 at the opposite longitudinal edges of the sheet and is bridged by the sheet. A gate 17 appropriately located, gives access directly to the median cavity 16 and permits a thermoplastic material to be injected into the median cavity and consequently into all the cavities of the mold because of their interconnection.

Assuming use of a thermoplastic and a compatible paneling material which will result in a strong bond at their interfaces, the panel 10 produced in such a mold will have opposed marginal longitudinal plastic structural sections 18, opposed marginal lateral plastic structural sections 19 interconnecting the longitudinal section 18 at their ends, a median plastic structural section 20 interconnecting the sections 18 at their midpoints, and a pair of panel elements 21 and 22 defined by such structural sections.

Many thermoplastic materials shrink after injection and upon removal from a mold whereas many flexible sheet materials such as some papers do not. Injection molding such as that with which the present invention is concerned produces a strong bond at the interfaces between the paneling and the plastic members such as substantially to reduce shrinkage of the plastic members at the interfaces. At the interfaces, then, there is a minimum of shrinkage. However, maximum shrinkage occurs at the face of the plastic members remote from the inshrinkage gradient from minimum to maximum inbetween.

The result is warpage in the paneling as illustrated in FIG. 4. The devices and methods of the present invention seek to reduce or prevent this warpage.

Various embodiments of the invention are illustrated in FIGS. 5 to 12 in the form of fragmental sections. Unless stated otherwise, it should be understood that the mold and the paper or cardboard paneling are the same as in FIG. 2. It should be understood also that the paneling, in practice, may have various forms and contours and may be incorporated in containers of numerous types.

During the molding operation according to the embodiment of the invention illustrated in FIGS. 5 and 5a a narrow flat strip of sheet material 23, preferably paper or cardboard is inserted adjacent the top face of each of the mold cavities 15 and 16. This insert strip, in the finished product is embedded in the molded plastic marginal and median structural member sections 18, 19 and 20 opposite to and in spaced relation with the portions of the paneling material resting on the mold bed in the portions thereof defining the bottom of the mold cavities. The strips of sheet material 23 have bonded member section at the opposed portions of the paneling. In such a construction the greatest resistance to shrinkage is at the bonded interfaces. Since the bonded interfaces with the insert strips on the one hand, and with the paneling on the other are spaced apart and located near the opposite faces of the plastic structural elements, the shrinkage forces are substantially balanced out and there is very little tendency for a structural member of this type to cause warpage.

In the embodiment of the invention illustrated in FIGS. 6 and 6a, there is provided for the panel section 11, a flange section 24 extending at right angles to the panel section and another marginal section 25 integral therewith extending in a reverse direction along and parallel with the paneling 11. The reversely extending members 25 are entirely within the confines of the mold cavity, and are buttressed by the top wall 15 thereof during the molding operation. The flange sections 24 are buttressed by the more remote peripheral side walls of the cavity 15 during the molding operation. The flanges and the reversely extending sections, because of their bonded interfaces with the plastic structural member sections introduces opposing forces in the plastic members to prevent warpage. Mention should also be made of the fact that that flange 24 acts in the nature of a beam to introduce stiffness which counteracts warpage.

In the embodiment of the invention illustrated in FIGS. 7 and 7a, paneling 11 may be formed at its peripheral edge with a flange section 26 turned upwardly at an angle of approximately 90° This flange is buttressed by the more remote peripheral side wall of the mold cavity 15 during the molding operation.

Almost any structural shape capable of acting as a beam to resist bending will act to resist warpage in composite paneling provided it has a bonded interface with the plastic structural frame member of the panel and provided too that at least sections of the bonded interface are disposed out of the plane of the paneling.

In the embodiment of the invention illustrated in FIGS. 8 and 8a, a structural section in the form of a Z (or reverse Z depending on the direction the section is taken) is presented at that peripheral edge of the paneling 11. A top portion 27 of the section which extends outwardly is buttressed at its inner edge by the less remote side wall of the mold cavity 15 and at the top by the top wall of the mold cavity. The buttressed inner edge of top portion 27 is connected by a downwardly and outwardly sloping web member 28 with the outermost edge of main paneling element 11. Paneling element 11 extends for a substantial distance into the mold cavity 15 and is buttressed beneath by the mold cavity's base. In this embodiment of tht invention, structural member 19 is in effect divided longitudinally into two parts. Shrinkage in the plastic part at the right (FIG. 8a) is controlled by the interfaces at the bottom of the upper member 27 and at the top of the intermediate web 28. Shrinkage in the plastic part at the left is controlled by the interfaces at the bottom of the intermediate web 28 and at the top of panel sheet 11. In this embodiment, the portion of the mold at the left of web 28 is filled with thermoplastic material through the gate associated with the median mold cavity 16. The portion of the mold at the right of web 28 may more conveniently be filled by an additional gate 29 communicating directly with the mold cavity.

In the embodiment of the invention illustrated in FIGS. 9 and 9a, paneling member 11 in its marginal areas is folded upwardly to form a vertical web 30 and then outwardly to form an offset horizontal flange 31. During injection molding vertical web 30 is buttressed by the less remote lateral wall of the mold cavity and the offset horizontal flange 31 by the top wall of the mold cavity. In this embodiment the tendency of structural member 19 is to warp in a direction concave downwardly. This tendency is resisted, however, by the stiffness of the vertical member 30 acting through its bonded interface with the plastic member 19. In this embodiment the median mold cavity 16 (FIG. 2) is isolated from the peripheral mold cavities 18 and 19. Accordingly, an additional gate 32 giving access to the mold cavity beneath the horizontal marginal section 31 is provided.

The embodiment of the invention illustrated in FIGS. 10 and 10a is particularly suitable for preventing warpage along a median structural element located as is the element 20 in FIG. 1. A channel section comprising base 33 and sidewall portions 34 is embossed in the paneling 11, and a correspondingly shaped channel 35 is routed in the mold bed 16 to accommodate it. Thermoplastic material is injected through gate 17 to produce a plastic structural reinforcing element 20 with bonded interfaces at the sides and at the base of the channel. The effect of shrinkage that produces warpage is minimized by the stiffness of the channel embossment whose rigidity is transmitted through the bonded interfaces.

The embodiment illustrated in FIGS. 11 and 11a is quite similar to that of FIGS. 10, 10a. It differs in that an embossment 36 in the paneling is semi-cylindrical and that a routing 37 in the mold bed plate 16 is shaped to correspond. A semi-cylindrical routing 38 in mold cap 13 facilitates injection molding a rod like median plastic structural member 39 in bonded engagement with the concave surface of the semi-cylindrical channel in embossment 36. The embossment 36 through its bonded interfaces with member 39 acts to minimize shrinkage in the same manner as is described in connection with the products shown in FIGS. 10 and 11.

In all embodiments of the invention thus far described, the resistance to the shrinkage effect of the thermoplastic material may be increased by appropriately disposing the grain of the panel member with its linear dimension co-directional with the longitudinal dimension of the structural plastic member defining the panel. Ordinarily, paper has grain running in one direction. Resistance to bending is greater if the line of bend extends transversely of the grain as distinguished from longitudinally. Thus, paper made according to the cylinder process may have a ratio of resistance to bending transversely of the grain as compared to longitudinally of the grain as high as 4. The corresponding ratio for paper made according to the Fourdrinier process may be 2. Accordingly, plastic structural reinforcing members injection molded co-directional with the paper's grain have greater resistance to the effects of shrinkage than if the structural members are molded transversely of the grain.

In FIGS. 12 and 12a there is shown an embodiment of the invention in which paneling 11 along its marginal edge is formed with a ridge 40 whose crown 41 engages the top wall of the mold cavity 15. One lower edge 42 of the ridge is located at the line where the paneling enters the less remote side of the mold cavity. The other lower edge 42 of ridge 40 abuts the more remote side wall of the mold cavity 15 at the base thereof where it meets the mold bed. The mold cavity adjacent the inner side of the ridge is connected with the median mold cavity 16. The mold cavity adjacent the outer side of the ridge is filled through a gate 43 entering through the mold cap 13 whereas the mold cavity below the ridge is filled through a gate 44 entering through the mold bed 16. In this embodiment, the effects of shrinkage are reduced first by isolating the shrinkage forces that prevail in the respective mold cavity sections, by reducing the resistance to transverse bending inherent in an embossed ridge of this type and lastly by providing large interface areas out of the plane or contour of the paneling as compared with the cross sectional areas of plastic in the respective isolated sections of the reinforcing plastic structural members.

In FIG. 13 there is illustrated a fragmental panel member with injection molded marginal structural members 45 associated with paneling 46 in which the plastic material of the members after removal of the panel from the mold is upset to provide alternate greater and lesser thicknesses 47 and 48 respectively. Considering by way of reference, a plane A joining the portions of lesser thickness, it has been found that the shrinkage forces in the plastic material above the reference plane i.e., in the portions 47 of greater thickness isolate themselves and tend to balance out. The maximum arm of the bending moments acting in cooperation with the shrinkage forces, to warp the panel is the distance $p$ between the reference plane A and the interfaces of the structural members and the paneling 46. Since this moment arm is substantially less than the moment arm that would be effective in the absence of upsetting the material, there is a lesser tendency for the paneling to warp.

In FIGS. 14 to 16 there is illustrated another embodiment of the invention in which the effect of warpage in the plastic structural elements is reduced by using marginal areas of the paneling material as the shrinkage resisting inserts. Such inserts are disposed in a direction longitudinally of the structural plastic member sections and in a median position so far as the resultant of the linear shrinkage forces in such sections are concerned.

As shown, a composite panel which, by way of example, may be either a detached or integrally hinged lid of a container, comprises a central panel 50 defined along its peripheral edges by plastic structural member sections 51 which promote its strength and determine its configuration. The structural member sections 51 are injection molded into bonded relation with the paneling material along marginal portions 52 thereof adjacent such peripheral edges. For ease in understanding, the marginal portions and the edges of the paneling material to which the plastic structural member sections are bonded may be considered an insert which acts to resist shrinkage of the plastic member along their bonded interfaces. If the bond remains intact, and the strength of the paneling material in a longitudinal direction is sufficient to resist linear compaction of the paneling material, then no shrinkage of the plastic material occurs at the interfaces.

But longitudinal shrinkage in the plastic material will occur outwardly from the bonded interfaces and the amount of shrinkage along any plane parallel to the paneling material will depend upon the distance of such plane from the median plane between the opposite faces of the paneling material. For reasons previously stated, if the transverse cross-section of a plastic structural member extends in one direction only from such median plane shrinkage will cause the plastic member and consequently the panel to assume a concave bend or warp in the same direction.

However, in accordance with the invention, if the transverse cross-section of the plastic structural member section 51 is built up in both directions, i.e., above and below, the median plane of the paneling the resultant of the linear forces acting on each side of the plane can be balanced out and the plastic structural member maintained in a straight or unbent condition.

It is not necessary that the build up of plastic material on one side or the other of the median plane be identical in order to balance out the forces tending to produce bending or warping. Thus, the shrinkage forces acting in a section of given width and given depth on one side of the median plane can be made to balance out the shrinkage forces acting in a section of greater width and less depth on the other side of the interface.

Some of the thermoplastic resins suitable for practicing the present invention, i.e., polyethylene, polypropylene, polystyrene, etc. by way of example, have different shrinkage characteristics and it is possible, depending upon the cross sectional dimensions of a plastic structural section on opposite sides of the median, that the paneling material 50 may be unable to resist linear compaction along the bonded interface even though the structural member per se remains straight. To state it differently, if dimensions $a$ and $b$ of panel elements 50 (FIG. 17) are compacted respectively to dimensions $a-c$ and $b-c$, because of longitudinal shrinkage of the plastic structural sections at their bonded interface with the paneling material, the central area defined by the compacted marginal portions will buckle to produce an undesired or unsightly appearance 50a. The buckled appearance may be remedied by embossing the paneling material within the framework of the structural members as shown (FIGS. 15, 16). The embossment adds a pleasing effect to what otherwise may be an unsightly defect.

The embossment may be accomplished on the same machine that performs the molding operation (FIG. 20). Upon completion of the molding cycle, and opening of the mold, the molded container is moved to a second position to locate the panel 50 in position for engagement between male and female embossing tools 53, 54 as the molding machine moves the male and female mold parts to mold closing position in the next molding cycle. The unsightly appearance of the buckled panel section may be eliminated entirely in this way.

Suitable thermoplastics usable in practicing the invention as previously stated include polyethylene, polypropylene and polystyrene. Suitable also are the nylons, vinyls, polycarbonates, acrylics and perhaps others. Suitable paneling material include sulphates and sulphites made by the Fourdrinier process, filled board made by the cylinder process as well as other types of sheet material.

The invention has been illustrated in connection with one embodiment thereof, but many modifications thereof are included within its spirit. The invention therefore is to be limited only by the scope of the appended claims.

What is claimed is:

1. In a composite panel structure comprising a blank of paper or fiberboard having a given surface configuration and a rigid, thermoplastic reinforcing member of substantial length as compared to its dimensions in transverse section, said thermoplastic member having been injection molded into joined relationship and fixed association with said blank for imparting strength and rigidity thereto and for preserving the desired surface configuration thereof, the joined relationship and fixed association of said thermoplastic member and said blank defining a first bonded interface extending lengthwise therebetween, the improvement comprising means spaced in said thermoplastic member at a position remote from said first bonded interface for reducing the lengthwise shrinkage forces existent in said thermoplastic member at said remote position thereby counteracting the differing lengthwise shrinkage forces in said thermoplastic member at said first bonded interface and at said remote position which tend to bend said blank out of its desired configuration.

2. The improvement in a composite panel structure according to claim 1 wherein the forces tending to bend said blank out of its desired configuration exist in said thermoplastic member at a position disposed on one side of the plane of said first bonded interface and wherein said shrinkage force reducing means counteracting said bending forces are disposed in said thermoplastic member at a position on the opposite side of the plane of said first bonded interface.

3. The improvement in a composite panel structure according to claim 1 wherein the shrinkage force reducing means in said thermoplastic member at said position remote from said first bonded interface is a strip of paper or fiberboard disposed lengthwise in the same direction as said first bonded interface but separated therefrom to define a second bonded interface between said strip and said thermoplastic member, said second interface being disposed in a plane parallel to the plane of said first bonded interface existent between said thermoplastic member and said blank.

4. The improvement in a composite panel structure according to claim 1 wherein the shrinkage force reducing means in said thermoplastic member at said position remote from said first bonded interface comprises a series of ridges and intermediate depressions formed in the surface of said thermoplastic member which is remote from said first bonded interface, said ridges and depressions being disposed in said thermoplastic member generally at right angles to the direction in which the shrinkage forces act in said thermoplastic member.

5. The improvement in a composite panel structure according to claim 1 wherein the shrinkage force reducing means in said thermoplastic member at said position remote from said first bonded interface is a strip of paper or fiberboard which is integral with and disposed along marginal portions of said blank.

6. The improvement in a composite panel structure according to claim 5 wherein the shrinkage force reducing means in said thermoplastic member at said position remote from said first bonded interface and integral with and disposed along marginal portions of said blank presents a second bonded interface between said shrinkage force reducing means and said thermoplastic member, which second bonded interface is disposed in a plane differing from the plane of said first bonded interface existent between said thermoplastic member and said blank.

7. The improvement in a composite panel structure according to claim 5 wherein the shrinkage force reducing means in said thermoplastic member at said position remote from said first bonded interface and integral with and disposed along marginal portions of said blank present a second bonded interface between said shrinkage force reducing means and said thermoplastic member, said second bonded interface being disposed along a plane having the same spaced relationship throughout its entire length with the plane of said first bonded interface existent between said thermoplastic member and said blank.

8. The improvement in a composite panel structure according to claim 5 wherein the shrinkage force reducing means in said thermoplastic member at said position remote from said first bonded innterface and integral with and disposed along marginal portions of said blank presents a second bonded interface between said shrinkage force reducing means and said thermoplastic member, said second bonded interface being disposed along a plane parallel to the plane of said first bonded interface existent between said thermoplastic member and said blank.

9. The improvement in a composite panel structure according to claim 5 wherein the shrinkage force reducing means in said thermoplastic member at said position remote from said first bonded interface and integral with and disposed along marginal portions of said blank presents a second bonded interface between said shrinkage force reducing means and said thermoplastic member, said second bonded interface being disposed along a plane at an angle with respect to the plane of said first bonded interface existent between said thermoplastic member and said blank.

10. The improvement in a composite panel structure according to claim 5 wherein the shrinkage force reducing means in said thermoplastic member at said position remote from said first bonded interface and integral with and disposed along marginal portions of said blank presents second and third bonded interfaces between said shrinkage force reducing means and said thermoplastic member, said second bonded interface being disposed along a plane at an angle with respect to the plane of said first bonded interface existent between said thermoplastic member and said blank, and said third bonded interface being disposed along a plane parallel to the plane of said first interface existent between said thermoplastic member and said blank.

11. The improvement in a composite panel structure according to claim 5 wherein the shrinkage force reducing means in said thermoplastic member at said position remote from said first bonded interface and integral with and disposed along marginal portions of said blank presents second and third bonded interfaces between said shrinkage force reducing means and said thermoplastic member, said second and third bonded interfaces being disposed on opposite surfaces of said strip along a pair of planes parallel to each other and disposed at an angle with respect to the plane of said first bonded interface existent between said thermoplastic member and said blank.

12. The improvement in a composite panel structure according to claim 5 wherein the shrinkage force reducing means in said thermoplastic member at said position remote from said first bonded interface is an embossment in said blank presenting a ridge on one face of said blank and a recess on the other face thereof, said embossment presenting a second bonded interface between said shrinkage force reducing means and said thermoplastic member at the base of said recess.

References Cited

UNITED STATES PATENTS

| | | |
|---|---|---|
| 1,038,095 | 9/1912 | Davis _____ 161—145 XR |
| 2,125,838 | 8/1938 | Stark _____ 161—97 XR |
| 2,359,347 | 10/1944 | Woodman _____ 161—143 XR |
| 2,397,415 | 3/1946 | Ghez et al. _____ 161—118 |
| 2,719,804 | 10/1955 | Carlson. |
| 2,780,572 | 2/1957 | Carlson _____ 161—141 XR |
| 3,074,832 | 1/1963 | Graff. |
| 3,082,587 | 3/1963 | Brimberg. |
| 3,107,991 | 10/1963 | Taussig _____ 264—279 XR |
| 3,119,540 | 1/1964 | Schenk et al. _____ 229—2.5 |

ROBERT F. BURNETT, Primary Examiner

W. A. POWELL, Assistant Examiner

U.S. Cl. X.R.

161—103, 104, 118, 126; 156—227, 242, 75; 264—271

PO-1050
(5/69)

UNITED STATES PATENT OFFICE
CERTIFICATE OF CORRECTION

Patent No. 3,493,458  Dated February 3, 1970

Inventor(s) Francis J. Santangelo

It is certified that error appears in the above-identified patent and that said Letters Patent are hereby corrected as shown below:

In column 1, line 22, in the Abstract, the word "warpage" is mispelle In column 2, line 68, after the word "material", the phrase -- constitute the shrinkage resistance inserts and in which -- is left out. In column 3 line 49, after the word "the", the phrase -- interfaces, and, it is believ a substantially uniform -- is left out. In column 3, line 71, after the word "bonded", the phrase -- interfaces with the plastic material of the structural -- is left out.

SIGNED AND
SEALED
JUL 7 1970

(SEAL)
Attest:

Edward M. Fletcher, Jr.
Attesting Officer

WILLIAM E. SCHUYLER, JR.
Commissioner of Patents